(12) United States Patent
Rosenberg et al.

(10) Patent No.: US 7,751,592 B1
(45) Date of Patent: Jul. 6, 2010

(54) SCORING ITEMS

(75) Inventors: Charles Rosenberg, Palo Alto, CA (US); Henry A. Rowley, Sunnyvale, CA (US); Radhika Malpani, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 962 days.

(21) Appl. No.: 11/331,355

(22) Filed: Jan. 13, 2006

(51) Int. Cl.
  *G06K 9/00* (2006.01)
  *G06F 15/173* (2006.01)
(52) U.S. Cl. .................. 382/112; 382/190; 709/224
(58) Field of Classification Search .......... 382/100, 382/135–140, 155–161, 168, 181, 190, 194, 382/199, 209, 224, 232, 254, 264, 275, 276, 382/310, 312; 707/6; 709/224
  See application file for complete search history.

(56) References Cited

U.S. PATENT DOCUMENTS

| | | | | |
|---|---|---|---|---|
| 5,883,986 | A * | 3/1999 | Kopec et al. | 382/310 |
| 6,647,146 | B1 * | 11/2003 | Davison et al. | 382/199 |
| 6,976,070 | B1 * | 12/2005 | Hoashi et al. | 709/224 |
| 7,120,289 | B2 * | 10/2006 | Baumberg | 382/154 |
| 7,349,901 | B2 * | 3/2008 | Ramarathnam et al. | 707/6 |
| 7,352,912 | B2 * | 4/2008 | Eschbach | 382/264 |

OTHER PUBLICATIONS

Yahoo! Search Preferences, http://search.yahoo.com/preferences/preferences?pref_done=http%3A%2F%2Fimages.search.yahoo.com%2..., Apr. 13, 2006.
S. Yoo, "Intelligent Multimedia Information Retrieval for Identifying and Rating Adult Images," Proceedings of KES, 2004, Abstract.
H. Zheng et al., "Blocking Adult Images Based on Statistical Skin Detection," Electronic Letters on Computer Vision and Image Analysis, 2004, pp. 1-14.
D. Forsyth et al., "Automatic Detection of Human Nudes," International Journal of Computer Vision, 1999, pp. 1-16.
H. Rowley et al., "Large Scale Image-Based Adult-Content Filtering," VISAPP, Sebutal, Portugal, 2006, pp. 1-7.
R. Schettini et al., "On the Detection of Pornographic Digital Images," Proceedings of SPIE, 2003, pp. 1-9.
VIMA Technologies, "Revolutionizing the Visual Searching and Categorizing of Images", http://www.vimatech.com/vimafilter.htm, Jan. 9, 2006, pp. 1-3.

* cited by examiner

*Primary Examiner*—Seyed Azarian
(74) *Attorney, Agent, or Firm*—Harrity & Harrity, LLP (57) ABSTRACT

A system identifies an image and determines whether the image contains inappropriate content based on first data associated with the image, second data associated with a document that contains the image or refers to the image, and/or third data associated with a group of documents with which the image is associated.

7 Claims, 7 Drawing Sheets

SCORING ITEMS

FIELD OF THE INVENTION

Implementations consistent with the principles of the invention relate generally to information retrieval and, more particularly, to determining scores for items, such as documents and images.

BACKGROUND OF THE INVENTION

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results and are returned to the user as links. In some instances, the search results may be inaccurate or undesirable.

SUMMARY OF THE INVENTION

In accordance with one implementation consistent with the principles of the invention, a device includes a memory and a processor. The memory is configured to store instructions, and the processor is configured to execute the instructions to generate a score for an image based on at least two of content of the image, content of a document that contains the image or refers to the image, or content of other documents with which the image is associated. The score represents the likelihood that the image contains inappropriate content. The processor is further configured to associate the score with the image.

In another implementation consistent with the principles of the invention, a computer-implemented method may include extracting a feature from an image; determining a first score for the image based on the extracted feature, the first score representing a likelihood that the image contains inappropriate content based on the extracted feature; generating a first set of statistics for the extracted feature representing a distribution of the feature across other images on at least one first document with which the image is associated; generating a second set of statistics based on the first score, the second set of statistics representing a distribution of the first score across the other images on the at least one first document; determining a second score for a second document that contains the image or refers to the image, the second score representing a likelihood that the second document contains inappropriate content; generating a third set of statistics based on the second score, the third set of statistics representing a distribution of the second score across the at least one first document; determining a third score for the image based on the first score, the first set of statistics, the second set of statistics, the second score, and the third set of statistics; and using the third score to determine whether to provide the image to a user.

In yet another implementation consistent with the principles of the invention, a method may include extracting a feature from an image; determining a first score for the image based on the extracted feature; generating a first set of statistics for the extracted feature representing a distribution of the feature across other images on one or more documents with which the image is associated; determining a final score for the image based on the first score and the first set of statistics.

In still another implementation consistent with the principles of the invention, a method may include extracting a feature from an image; determining a first score for the image based on the extracted feature; generating a first set of statistics based on the first score, the first set of statistics representing a distribution of the first score across other images on a group of documents with which the image is associated; and determining a final score for the image based on the first score and the first set of statistics.

In another implementation consistent with the principles of the invention, a method may include determining a score for a document, the score being based on text in the document; generating a set of statistics for a web site with which the document is associated, the set of statistics being based on the score; and providing search results using the score and the set of statistics.

In still another implementation consistent with the principles of the invention, a method may include identifying an image and determining whether the image contains inappropriate content based on first data associated with the image, second data associated with a document that contains the image or refers to the image, and third data associated with a group of documents with which the image is associated.

In yet another implementation consistent with the principles of the invention, a method may include generating at least one set of statistics for a web site, where the set of statistics relates to documents or images on the web site; and using the at least one set of statistics to identify documents or images that are to be provided in response to a search.

In another implementation consistent with the principles of the invention, a method may include determining a first score for a first image; determining a second score for a second image that is associated with the first image; and determining a third score for the image based on the first score and the second score.

In still another implementation consistent with the principles of the invention, a method may include determining a first score for a first document; determine second scores for a group of second documents with which the first document is associated, at least one second document in the group of second documents not containing a link to the first document; and determining a third score for the first document based on the first score and the second scores.

In still another implementation consistent with the principles of the invention, a method may include determining a first score for an item associated with a web site; determining second scores for other items associated with the web site; and determining information associated with the item based on the first score and the second scores.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Systems and methods consistent with the principles of the invention improve unreliable item scoring (e.g., document scoring and/or image scoring) by analyzing the time scoring in the context of other items form the same web site with which the item is associated. One implementation consistent with the principles of the invention is directed to detecting inappropriate content in an image. As used herein, "inappropriate content" refers to content that a user may find offensive or undesirable. For example, inappropriate content may include inappropriate content (e.g., pornographic content). A score may be determined for a given image based on different sources of information, including the content of the image itself. The score may represent the likelihood that the image contains inappropriate content. A search engine may remove the image from a set of search results, if desired by the user, based on the determined score.

Figure 1:
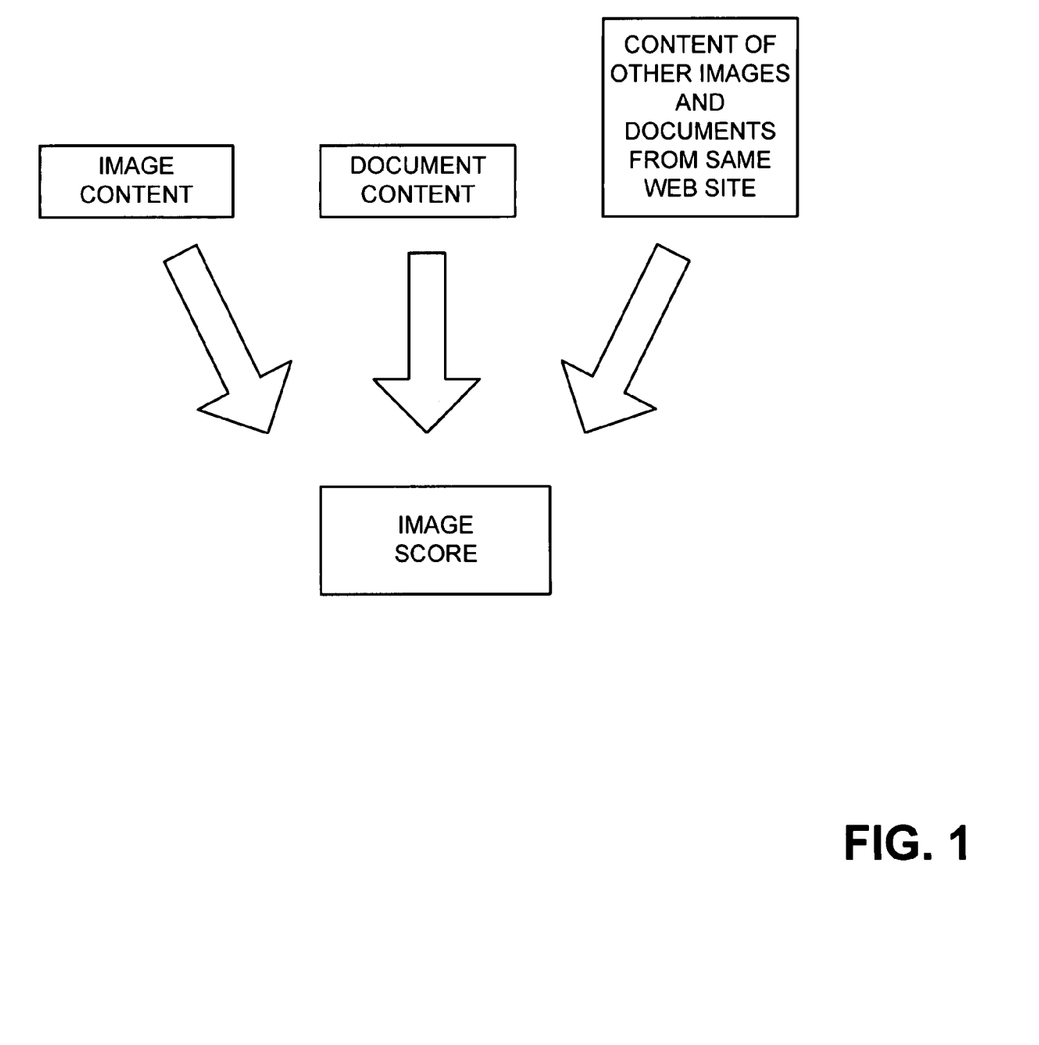
FIG. 1 is an exemplary diagram illustrating a concept consistent with the principles of the invention.

FIG. 1 is an exemplary diagram illustrating a concept consistent with the principles of the invention. As illustrated in FIG. 1, different sets of data may be used to determine a score for an image—the content of the image itself, the content of the document (e.g., web page) that contains the image or refers to the image, and the content of other images or documents from the same web site with which the image and/or document are associated. In the context of inappropriate content detection, if the score is above a threshold, the image may be considered to contain inappropriate content. In this situation, the image may be associated with a tag that indicates that the image contains inappropriate content. When a search is performed in which the image is retrieved as part of the search result set, the search engine (or user's browser) may determine whether or not to include the image in the search result set that is provided to the user based on the image score (or tag).

A "document," as the term is used herein, is to be broadly interpreted to include any machine-readable and machine-storable work product. A document may include, for example, an e-mail, a web site, a file, a combination of files, one or more files with embedded links to other files, a news group posting, a blog document, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
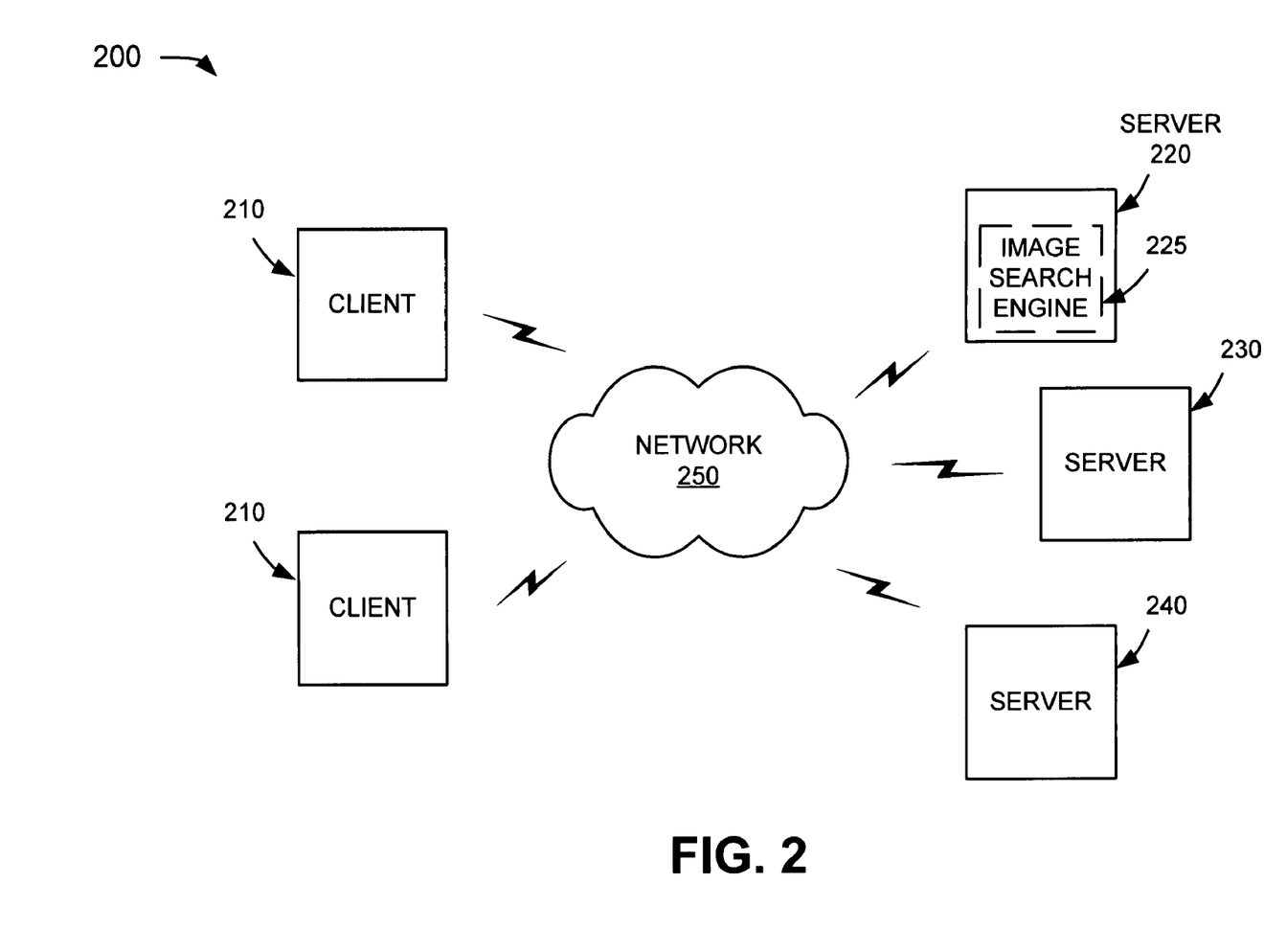
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. In one implementation, search engine 225 may include an image search engine that searches for images. Server 220 may crawl a corpus of documents (and images), index the documents (and images), and store information associated with the documents (and images) in a repository of documents (and images). Servers 230 and 240 may store or maintain documents (and images) that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
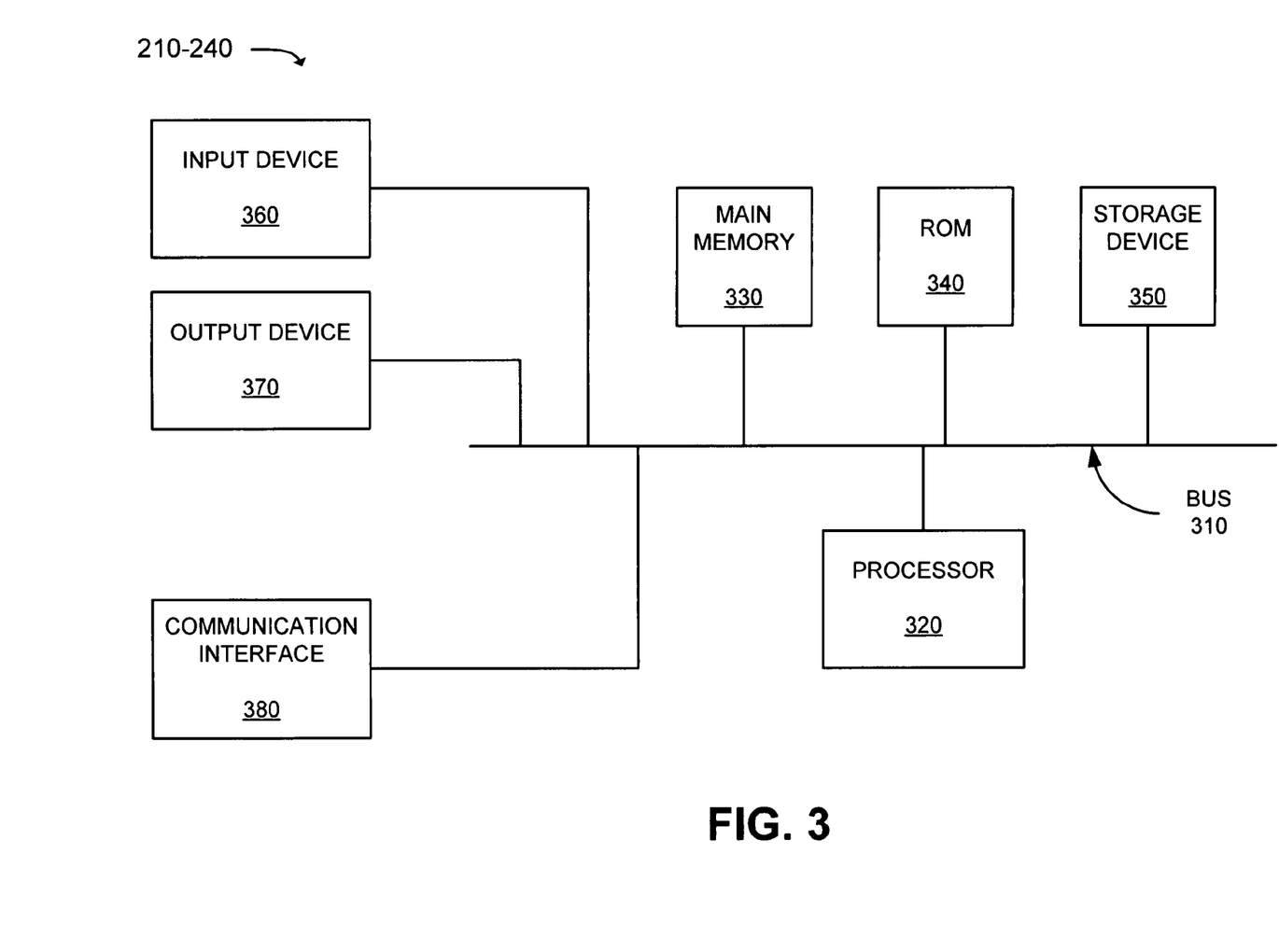
FIG. 3 is an exemplary diagram of a client or server entity in an implementation consistent with the principles of the invention.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions.

Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain image and/or document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Image Scoring System

Figure 4:
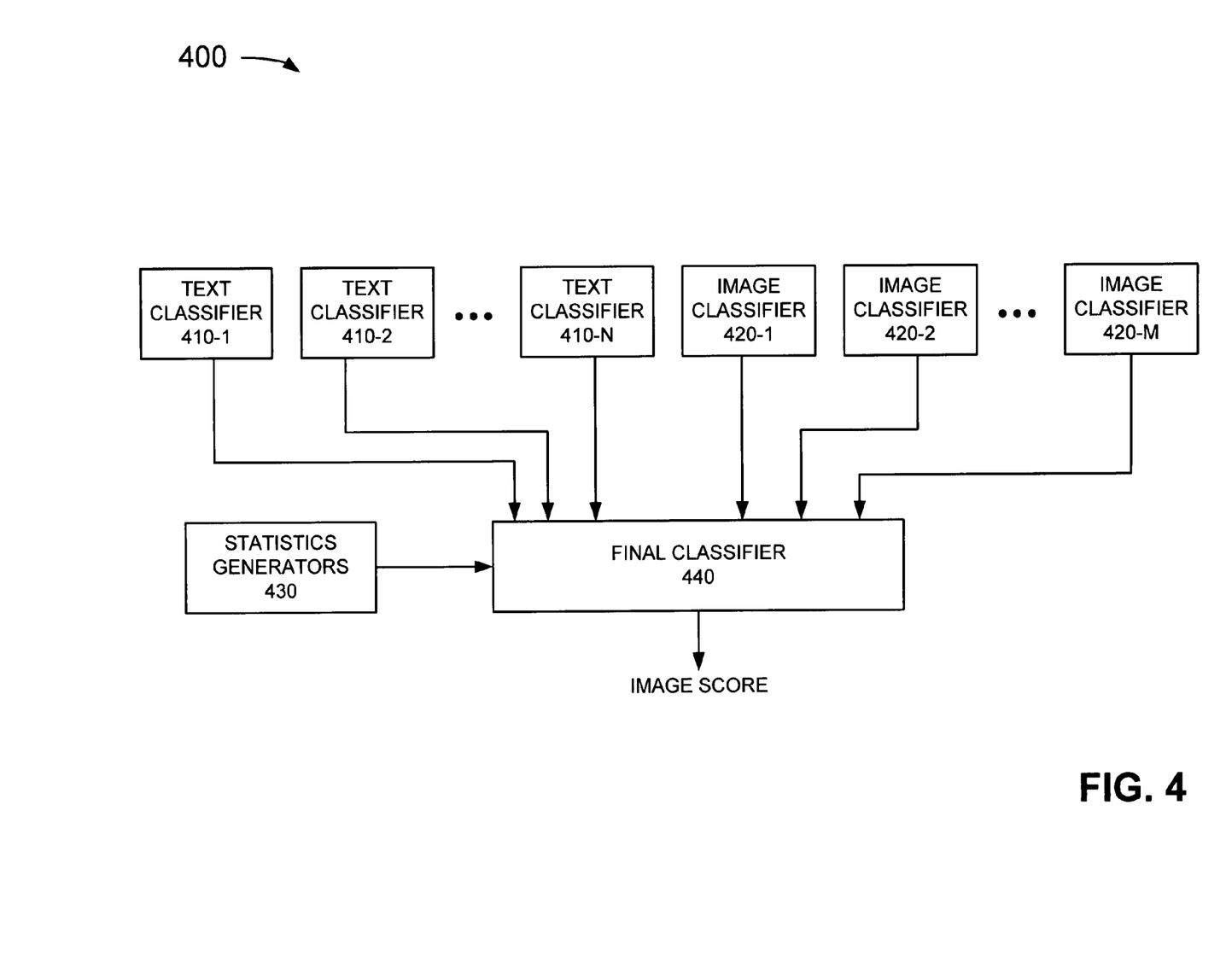
FIG. 4 is a functional block diagram of an image scoring system in an implementation consistent with the principles of the invention.

FIG. 4 is a diagram of an image scoring system 400 in an implementation consistent with the principles of the invention. Image scoring system 400 may be implemented by one or more software and/or hardware components within server 220. In another implementation consistent with the principles of the invention, image scoring system 400 may be implemented by one or more software and/or hardware components within another device or a group of devices separate from or including server 220.

As illustrated, image scoring system 400 may include a group of text classifiers 410-1 through 410-N (referred to collectively as text classifiers 410), a group of image classifiers 420-1 through 420-M (referred to collectively as image classifiers 420), one or more statistics generators 430, and a final classifier 440. Text classifiers 410 may receive text-based data and determine a score for the text-based data, representing the likelihood that the text-based data contains inappropriate content. In one implementation, the text-based data may include a document (e.g., a web page) that contains a particular image for which a score is to be determined or refers to the particular image and/or other documents (e.g., web pages) from the web site with which the particular image is associated. In one implementation consistent with the principles of the invention, all of the web pages from the web site may be fed into text classifiers 410 for analysis. Text classifiers 410 may include one or more decision trees, Bayesian classifiers, neural networks, some combination of these classification systems, or other well-known classification systems.

Image classifiers 420 may receive image-based data and determine a score for the image-based data, representing the likelihood that the image-based data contains inappropriate content. In one implementation, the image-based data may include the particular image itself, and/or other images from the web site with which the particular image is associated. In one implementation consistent with the principles of the invention, all of the images that are associated with the web site may be fed into image classifiers 420 for analysis. Image classifiers 420 may include one or more decision trees, Bayesian classifiers, neural networks, some combination of these classification systems, or other well-known classification systems.

Statistics generators 430 may receive text-based data from the document that contains the particular image (or refers to the particular image) and/or other documents from the web site with which the particular image is associated and determine statistics based on the received text-based data. In one implementation consistent with the principles of the invention, statistics generators 430 may generate statistics for the entire web site with which the particular image is associated. Statistics generators 430 may also receive image-based data from the image itself and/or from other images on the web site with which the particular image is associated and determine statistics based on the received image-based data. In one implementation consistent with the principles of the invention, statistics generators 430 may generate statistics based on all of the images on the entire web site with which the particular image is associated. Possible statistics generated by statistics generators 430 will be described below.

Final classifier 440 may receive scores from text classifiers 410 and image classifiers 420 and statistics from statistics generators 430 and determine a score for the particular image based on these inputs. As set forth above, the score may represent the likelihood that the particular image contains inappropriate content. Final classifier 440 may include one or more decision trees, Bayesian classifiers, neural networks, some combination of these classification systems, or other well-known classification systems It will be appreciated that text classifiers 410, image classifiers 420, and final classifier 430 may be trained in a well-known manner prior to determining a score for a particular image. In one implementation consistent with the principles of the invention, a set of documents (e.g., web pages) and images may be hand-labeled as to whether or not they contain inappropriate content. The hand-labeled set of documents and images may be used as training data to tune the parameters of classifiers 410, 420, and/or 440 to achieve the desired classification performance.

Exemplary Database

Figure 5:
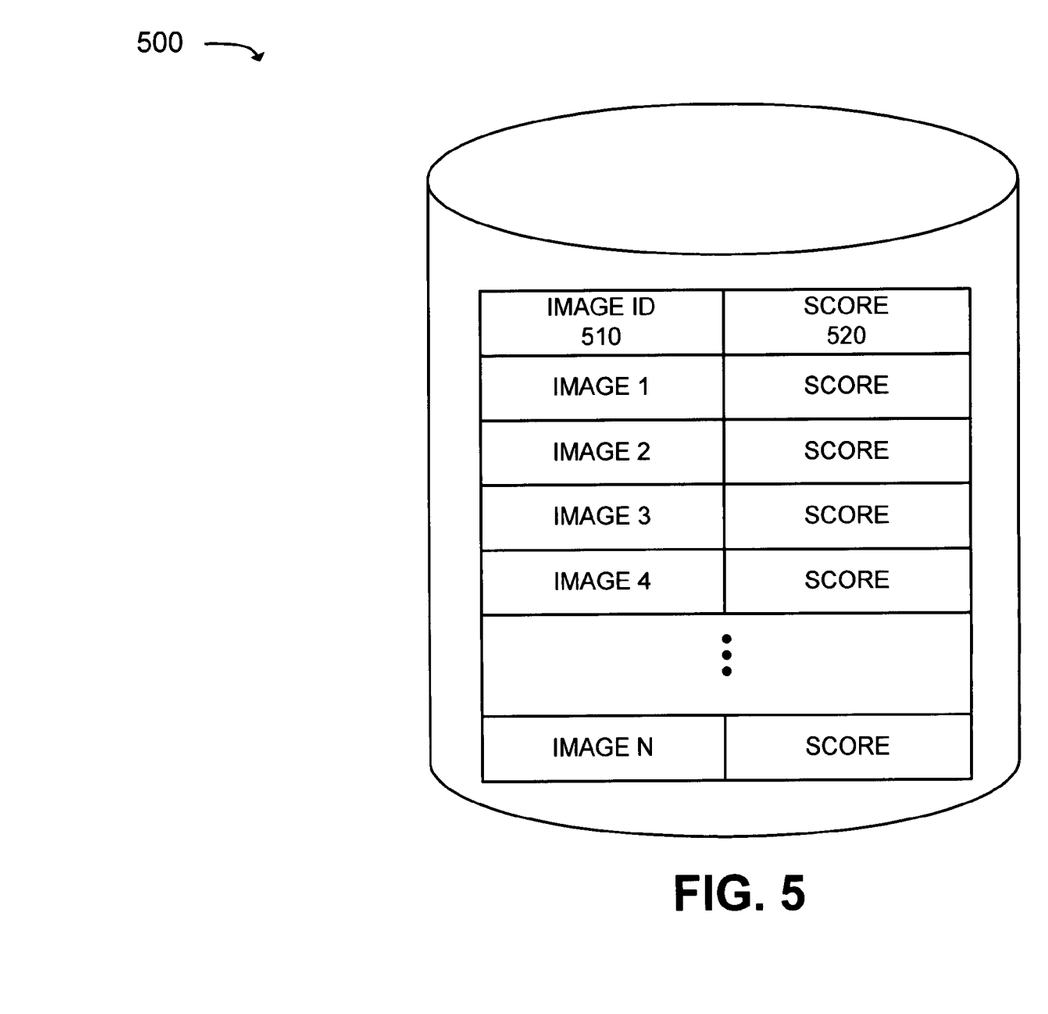
FIG. 5 is an exemplary database that may be associated with one of the servers of FIG. 2 in an implementation consistent with the principles of the invention.

FIG. 5 is an exemplary database 500 that may be associated with server 220 in an implementation consistent with the principles of the invention. Database 500 may be stored locally at server 220, for example, in main memory 330 or storage device 350, or stored external to server 220 at, for example, a possibly remote location. As illustrated, database 500 may include the following exemplary fields: an image identification (ID) field 510 and a score field 520. It will be appreciated that database 500 may include other fields than those illustrated in FIG. 5.

Image ID field 510 may store information identifying images. The information may include a unique identifier.

Score field 520 may store a numerical score for each image identified in field 510. In one implementation consistent with the principles of the invention, each score may represent the likelihood that the associated image identified in image ID field 510 contains inappropriate content. For example, the scores in score field 520 may range from 1 to 10, where a score of 10 may represent that it is very likely that the image contains inappropriate content, while a score of 1 may represent that it is very unlikely that the image contains inappropriate content. These numerical values and numerical range are provided for explanatory purposes only. In one implementation consistent with the principles of the invention, the score may be implemented as a tag, which simply indicates that the image likely contains inappropriate content (e.g., has a score above a threshold) or likely does not contain inappropriate content (e.g., has a score below a threshold).

Database 500 may be accessed in response to a search query received by server 220. Server 220 may demote or even eliminate an image from a set of search results based on the score from field 520.

Determining a Score for an Image

Figure 6:
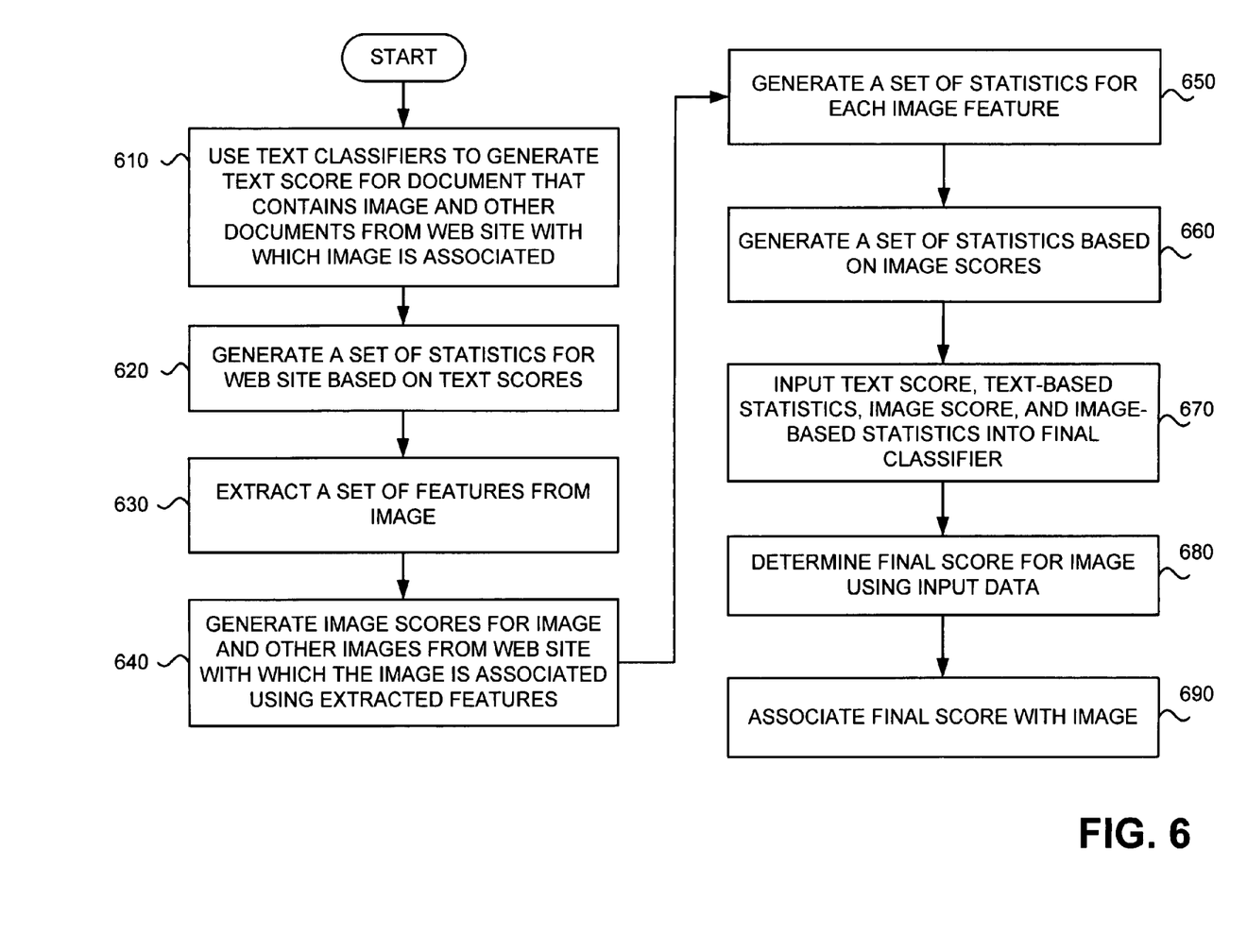
FIG. 6 is a flow chart of an exemplary process for determining a score for an image in an implementation consistent with the principles of the invention.

FIG. 6 is a flow chart of an exemplary process for determining a score for an image in an implementation consistent with the principles of the invention. Processing may begin by determining a text-based score for the document (e.g., web page) that contains the image or refers to the image (act 610). The text-based score may represent the likelihood that the document contains inappropriate content. In one implementation consistent with the principles of the invention, the text-based score may be determined by feeding the document into one or more of text classifiers 410. Text classifiers 410 may analyze the words in the document to determine the score for the document. For example, the higher the number of inappropriate content-related words that appear in the document, the more likely the document contains inappropriate content and, thus, the higher the score.

A text-based score may also be determined for some or all of the other documents (e.g., web pages) on the web site with which the image is associated (act 610). The text-based scores may represent the likelihood that the other documents contain inappropriate content. In one implementation consistent with the principles of the invention, the text-based scores may be determined by feeding the other documents into one or more of text classifiers 410. Text classifiers 410 may analyze the words in the documents to determine the scores for the documents.

There are a number of variations possible for determining what group of documents should be considered a "web site." For example, a web site may be considered to correspond to a particular domain, directory, host, etc. Thus, one possibility is to, for example, consider the documents that occur on <somedomain>.com with which the image is associated. Another possibility is to consider the documents included in a directory, such as www.somedomain.com/<dirname>/, with which the image is associated. Yet another possibility is to consider the documents for a specific host, such as <somehost>.somedomain.com, with which the image is associated. In essence, a "web site" is considered to correspond to a group of documents.

These variations can also be used in combination and the selection of a particular variation can be performed automatically on a case by case basis such that a decision is made as to what grouping of data (e.g., data from a domain, directory, host, etc.) will perform best. This can be based on prior knowledge of what group of documents seems to have been generated by the same author or which might perform best in terms of final classification accuracy.

It is also possible to perform multiple aggregations using different variations and provide the statistics computed from all of those as separate inputs to the final classifier. In practice, documents and images could also be grouped by any other criteria.

It will be appreciated that with respect to images, there are actually two web addresses that can be taken into account— the web address of the image and the web address of the document or documents that refer to that image. The image may be hosted on the same web site as the document(s) that refer to it or a different web site. Therefore, text and image data may be grouped according to the web address of the image, the web address of the text document, or some combination of these two sources.

A set of statistics may be generated by statistics generators 430 based on the text-based scores (act 620). For example, the text-based score of the document that contains the image or refers to the image may be combined with the text-based scores of the other documents from the web site to generate a set of statistics that, for example, characterize the distribution of the document's text-based score across the other documents on the web site. The statistics may be determined as, for example, a mean score, a median score, a variance of the score, a sum of the score, etc.

A set of features may be extracted from the image (act 630). In one implementation consistent with the principles of the invention, a feature may correspond to a value that represents some aspect of the content of the image. For example, the extracted features may include the number of detected faces in the image, the proportion of the image that is taken up by the detected face(s), the number of skin-colored pixels in the image, the average color of the top half of the image, the percentage of the image that contains a skin-tone color, etc. Other features may additionally or alternatively be used.

An image-based score may be determined for the image (act 640). The image-based score may represent the likelihood that the image contains inappropriate content. In one implementation consistent with the principles of the invention, the image-based score may be determined by feeding the features from the image into one or more of image classifiers 420. Image classifiers 420 may analyze the features to determine the score for the image. For example, if a large proportion of the image includes a skin-tone color, the more likely the image contains inappropriate content. A number of techniques exist for determining the likelihood that an image contains inappropriate content based on features from the image. For example, H. Rowley et al., "Large Scale Image-Based Adult-Content Filtering," VISAPP, Sebutal, Portugal, 2006, pp. 1-7; D. Forsyth et al., "Automatic Detection of Human Nudes," International Journal of Computer Vision, 1999, pp. 1-16; H. Zheng et al., "Blocking Inappropriate Images Based on Statistical Skin Detection," Electronic Letters on Computer Vision and Image Analysis, 2004, pp. 1-14; R. Schettini et al., "On the Detection of Pornographic Digital Images," Proceedings of SPIE, 2003, pp. 1-9; and S. Yoo, "Intelligent Multimedia Information Retrieval for Identifying and Rating Inappropriate Images," Proceedings of KES, 2004, pp. 164-170, all of which are incorporated in their entireties by reference herein, describe techniques for determining the likelihood that an image contains inappropriate content. Any one of these techniques (or another technique) or combination of these techniques (or other techniques) may be used for determining a score for the image.

An image-based score may be determined for one or more other images (act 640). In one implementation consistent with the principles of the invention, image-based scores may be determined for some or all of the other images that are contained on the web site with which the image is associated. The image-based scores may represent the likelihood that the other images contain inappropriate content. In one implementation consistent with the principles of the invention, the image-based scores may be determined by feeding features from the other images into one or more of image classifiers 420. Image classifiers 410 may analyze the features to determine the scores for the other images.

A set of statistics may be generated by statistics generators 430 for each feature that was extracted from the image (act 650). For example, a set of statistics may be generated for each feature that characterizes the distribution of the particular image feature across other images on the web site. In one implementation consistent with the principles of the invention, the distribution of the particular image feature across all of the images on the web site may be determined. The set of statistics may be generated based on, for example, the mean, the median, the standard deviation, the quantiles, the sum, etc.

A set of statistics may be generated by statistics generators 430 based on the image-based scores that were determined for the image and the other images (act 660). For example, a set of statistics may be generated that characterizes the distribution of the image-based score for the image across the other images on the web site. In one implementation consistent with the principles of the invention, the distribution of the image-based score across all of the images on the web site may be determined. The set of statistics may be generated based on, for example, the mean, the median, the standard deviation, the quantiles, the sum, etc.

The text-based score determined in act 610 above, the image-based score determined in act 640 above, and the statistics generated in acts 620, 650, and 660 above may be aggregated and forwarded to final classifier 440 as input data (act 670). Final classifier 440 may determine a final score for the image based on the input data (act 680). For example, final classifier 440 may determine the final score as follows:

F(text-based score, image-based score, text-based statistics, image feature statistics, image score statistics)=final score for image.

Final classifier 440 may combine the text-based score, the image-based score, the text-based statistics, the image feature statistics, and/or the image score statistics in any of a number of ways to arrive at a final score for the image. For example, in one implementation, a final score for the image may be determined by adding the different portions of the input data together. The text-based score, the image-based score, and the statistics may be combined and/or weighted in any manner. For example, in one implementation consistent with the principles of the invention, it may be determined that the image-based score is fairly accurate in predicting whether the image contains inappropriate content. In this situation, the image-based score may be weighted more heavily than the text-based score, the text-based statistics, the image feature statistics, and/or the image score statistics. In another implementation, the text-based score may be determined to be more important to determining whether an image contains inappropriate content. In that situation, the text-based score may be weighted more heavily. Alternatively, each portion of the input data may be multiplied by a corresponding factor (or weight) and the resulting values may be totaled to give the final score for the image. Other techniques for determining a final score for the image may alternatively be used. Moreover, it will be appreciated that final classifier 440 may determine a final score for an image using the text-based score, the image-based score, the text-based statistics, the image feature statistics, and the image score statistics or any combination of these inputs.

The final score may be associated with the image (act 690). For example, the final score may be associated, in a database, such as database 500, with information identifying the image for which the score has been determined. In this manner, database 500 may be populated with scores for images. The final scores can be updated periodically. In one implementation consistent with the principles of the invention, if the final score for the image is above a threshold, a tag (indicating that the image likely contains inappropriate content) may be associated with the image in database 500.

Presenting Search Results

Figure 7:
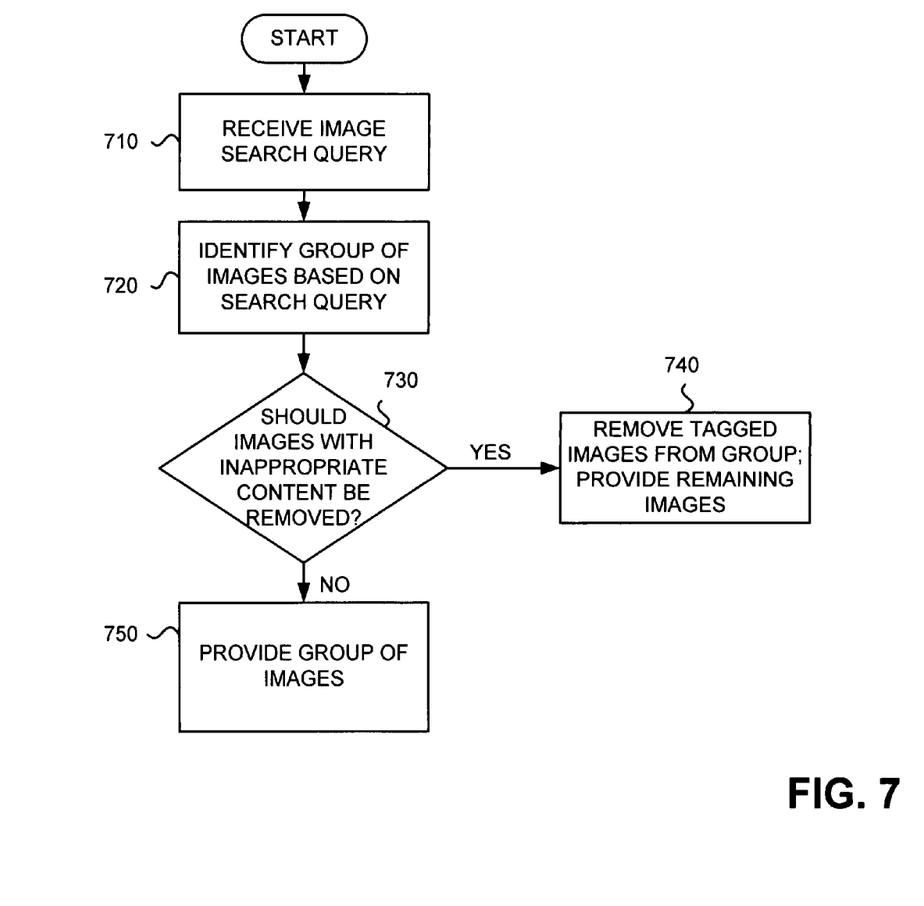
FIG. 7 is a flowchart of an exemplary process for presenting search results in an implementation consistent with the principles of the invention.

FIG. 7 is a flowchart of an exemplary process for presenting search results. In one implementation, the processing of FIG. 7 may be performed by one or more software and/or hardware components within server 220. In another implementation, the processing may be performed by one or more software and/or hardware components within another device or a group of devices separate from or including server 220.

Processing may begin with an image search query being received (act 710). For example, the user may provide a search query into a search box associated with a search engine (e.g., entering a search term into a search engine interface or a search box of an add-on toolbar). The web browser (or the add-on toolbar) may send the search query to a search engine, such as search engine 225 associated with server 220.

A set of images may be identified based on the image search query (act 720). For example, server 220 may determine an information retrieval (IR) score for the images. The IR score for an image may be determined using metadata associated with the image file itself and/or based on a matching of the search terms of an image search query to text surrounding the image. Other techniques for determining the IR score for an image are known to those skilled in the art.

It may be determined whether images with inappropriate content should be provided to the user (act 730). For example, in one implementation consistent with the principles of the invention, the user may set a preference as to whether the user wishes to receive images containing inappropriate content. If the user has indicated that the user does not wish to receive images containing inappropriate content (act 730), server 220 (or the user's browser) may remove any images from the set of identified images whose score is above a predetermined threshold, indicating that those images likely contain inappropriate content (act 740). In those situations in which the images are associated with tags, server 220 (or the user's browser) may remove any images from the set of identified images that have been tagged as containing inappropriate content. It will be appreciated that different threshold levels or different levels of tagging may be implemented. For example, the user may be given the option to select a level of image screening (e.g., low (meaning to let all images through), moderate (meaning to screen out only those images that the system is very certain contains inappropriate content), and high (meaning to screen out all images that possibly contain inappropriate content)). Therefore, if the user selects the moderate level of screening, some images containing inappropriate content may be presented to the user (e.g., those images whose scores (or tags) indicate that they possibly contain inappropriate content). Once the appropriate images have been removed from the identified set of images, the remaining images may be provided to the user (act 740).

If, on the other hand, the user has indicated that the user wishes to receive all images, including images containing inappropriate content (act 730), server 220 may provide the identified images to the user (act 750).

EXAMPLES

The following examples illustrate the above processing. In the first example, assume that a particular web site contains many inappropriate images, but only a few web pages that contain terms indicative of inappropriate content. In an approach that only took into account a single web page, only the small number of web pages that contain specific terms would be marked as inappropriate content. None of the other pages on the web site, however, would be tagged as containing inappropriate content. In the case of a single image-based classifier, classification may result in a weak unreliable signal for all of the images on the web site, which would not allow for the images to be individually tagged. However, in implementations consistent with the principles of the invention, which take into account not only content from the image itself, but also content from the web page that contains the image (or refers to the image), and/or the other web pages on the web site, the fact that there are many images that have a borderline content score on a web site that contains some inappropriate terms makes it possible to reliably classify these images as containing inappropriate content. If there are additional web pages on that web site that contain no images or contain images that have a very low content-based score, those images and web pages may correctly not be marked as containing inappropriate content.

In a second example, assume that a single web site hosts inappropriate images, but does not contain text that would identify those images as containing inappropriate content. Assume that these images are contained on web pages spread across many web sites, some of which contain text that identifies these images as containing inappropriate content and some that do not. In this situation, the web page text signals and the image content signals may be grouped according to the image's hosting web site address. As such, it is possible to identify this hosting web site as a source of inappropriate images. In this case, all of the images hosted by the web site may be tagged as containing inappropriate content. Moreover, based on implementations consistent with the principles of the invention, images on web sites that only point to those images, but contain no inappropriate-oriented text, may be tagged as containing inappropriate content. Implementations consistent with the principles of the invention may allow for images that contain inappropriate content to be accurately tagged.

CONCLUSION

Systems and methods consistent with the principles of the invention improve unreliable item scoring (e.g., document scoring and/or image scoring) by analyzing the time scoring in the context of other items form the same web site with which the item is associated. One implementation consistent with the principles of the invention is directed to detecting inappropriate content in an image. A score may be determined for a given image based on different sources of information, including the content of the image itself. The score may represent the likelihood that the image contains inappropriate content. A search engine may remove the image from a set of search results, if desired by the user, based on the determined score.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the above description focused on determining the likelihood that an image contains inappropriate content, it will be appreciated that some of the techniques described above are not so limited. For example, implementations consistent with the invention include the ability to logically represent a web site using statistics. Such logical representations may be used for other purposes, besides identifying images with inappropriate content. For example, text-based search may also be improved using such logical representations of web sites. Moreover, the techniques above show how a signal (or score), which when computed in isolation (e.g., for a single document or image) is unreliable, can be made reliable when used in conjunction with signals (or scores) collected from a group of documents or associated images.

While the above description focused on using content from an image, a document that contains the image or refers to the image, and content from a web site with which the image is associated in determining whether the image contains inappropriate content, it will be appreciated that any combination of these input sources or other input sources may be used. For example, in some implementations consistent with the principles of the invention, the input sources could also include (in addition to the other documents from the web site) some or all of the documents that link to the document that contains the image or refers to the image.

While series of acts have been described with regard to FIGS. 6 and 7, the order of the acts may be modified in other implementations consistent with the principles of the invention. Further, non-dependent acts may be performed in parallel.

The preceding description refers to a user. A "user" is intended to refer to a client, such as a client 210 (FIG. 2), or an operator of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more processors of one or more server devices, the method comprising:

extracting a feature from an image;

determining a first score for the image based on the extracted feature, the first score representing a likelihood that the image contains inappropriate content based on the extracted feature;

generating a first set of statistics for the extracted feature representing a distribution of the feature across other images on at least one first document with which the image is associated;

generating a second set of statistics based on the first score, the second set of statistics representing a distribution of the first score across the other images on the at least one first document;

determining a second score for a second document that contains the image or refers to the image, the second score representing a likelihood that the second document contains inappropriate content;

generating a third set of statistics based on the second score, the third set of statistics representing a distribution of the second score across the at least one first document;

determining a third score for the image based on the first score, the first set of statistics, the second set of statistics, the second score, and the third set of statistics; and using the third score to determine whether to provide the image to a user.

2. The method of claim 1 further comprising:

providing the image to the user when the third score is below a threshold.

3. The method of claim 1 further comprising:

associating a tag with the image based on the third score.

4. A system comprising:

logic to extract a feature from an image;

logic to generate a first score for the image based on the extracted feature, the first score representing a likelihood that the image contains inappropriate content based on the extracted feature;

logic to generate a first set of statistics for the extracted feature representing a distribution of the feature across other images on a web site with which the image is associated;

logic to generate a second set of statistics based on the first score, the second set of statistics representing a distribution of the first score across the other images on the web site;

logic to generate a second score for a document that contains the image or refers to the image, the second score representing a likelihood that the document contains inappropriate content;

logic to generate a third set of statistics based on the second score, the third set of statistics representing a distribution of the second score across other documents on the web site;

logic to generate a third score for the image based on the first score, the first set of statistics, the second set of statistics, the second score, and the third set of statistics; and logic to associate the third score with the image.

5. A method comprising:

identifying an image, determining whether the image contains inappropriate content based on first data associated with the image, second data associated with a document that contains the image or refers to the image, and third date associated with a group of documents with which the image is associated, where the determining includes generating the first data, where the generating the first data includes extracting a feature from the image, and determining the first data for the image based on the extracted feature, the first data representing a likelihood that the image contains appropriate content based on the extracted feature, generating the second data, where the second data represents a likelihood that the document contains inappropriate content, and generating the third data, where the generating the third data includes:

generating a first set of statistics for the extracted feature representing a distribution of the feature across other images on the group of documents, generating a second set of statistics based on the first data, the second set of statistics representing a distribution of the first data across the other images on the group of documents, and generating a third set of statistics based on the second data, the third set of statistics representing a distribution of the second data across the group of documents, the first set of statistics, the second set of statistics, and the third set of statistics forming the third data.

6. The method of claim 5 where the group of documents corresponds to a web site.

7. The method of claim 5 further comprising:

associating a tag with the image based on the determining step.

* * * * *